(12) United States Patent
Rothberg et al.

(10) Patent No.: US 6,412,083 B1
(45) Date of Patent: Jun. 25, 2002

(54) DISK DRIVE THAT SUPPORTS A LIST-REQUESTING COMMAND FOR ENABLING A HOST COMPUTER TO ASSIST IN RESCUING A RESCUE-CANDIDATE LOCATION HAVING A DRIVE-UNRECOVERABLE DATA

(75) Inventors: Michael S. Rothberg, Foothill Ranch; Jonathan L. Hanman, Anaheim, both of CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/397,837

(22) Filed: Sep. 16, 1999

(51) Int. Cl.[7] ................................................. H02H 3/05
(52) U.S. Cl. ............................ 714/42; 714/723; 360/53
(58) Field of Search ................................ 714/42, 7, 48, 714/57, 769, 710, 723, 718; 369/47.14, 53.16, 53.17; 360/53

(56) References Cited

U.S. PATENT DOCUMENTS

| 5,159,671 A | * | 10/1992 | Iwami .......................... 710/20 |
| 5,572,661 A | * | 11/1996 | Jacobson ....................... 714/7 |
| 5,646,923 A | | 7/1997 | Shea |
| 5,815,650 A | * | 9/1998 | Apperley et al. .............. 714/42 |
| 5,835,700 A | * | 11/1998 | Carbonneau et al. ......... 710/15 |
| 5,914,967 A | * | 6/1999 | Yomtoubian ................. 714/718 |
| 5,917,724 A | | 6/1999 | Brousseau et al. |
| 5,968,184 A | * | 10/1999 | Kedem ......................... 711/112 |
| 6,119,261 A | * | 9/2000 | Dang et al. ................... 360/53 |
| 6,279,089 B1 | * | 8/2001 | Schibilla et al. ............. 711/111 |
| 6,363,511 B1 | * | 3/2002 | Massoudi .................... 714/755 |

* cited by examiner

Primary Examiner—Robert Beausoleil
Assistant Examiner—Yolanda L. Wilson
(74) Attorney, Agent, or Firm—Milad G Shara, Esq.

(57) ABSTRACT

There is disclosed a method of operating a disk drive for enabling a host computer to assist in rescuing a rescue-candidate location having drive-unrecoverable data. The method includes identifying a selected addressable location as a rescue-candidate location if the selected addressable location contains drive-unrecoverable data, and recording the logical address of the rescue-candidate location in a list. The method further includes transferring the list to the host computer via an interface in response to a list-requesting command from the host computer, and responding to a write command from the host computer to write host data to a selected rescue-candidate location having a logical address recorded in the list such that a subsequent read operation can recover the host data. There is also disclosed a method of operating a computer system for enabling a host computer to assist in rescuing a rescue-candidate location having drive-unrecoverable data.

9 Claims, 3 Drawing Sheets

DISK DRIVE THAT SUPPORTS A LIST-REQUESTING COMMAND FOR ENABLING A HOST COMPUTER TO ASSIST IN RESCUING A RESCUE-CANDIDATE LOCATION HAVING A DRIVE-UNRECOVERABLE DATA

CROSS REFERENCE TO RELATED APPLICATIONS

The subject matter of this application is related to the subject matter of an application [K35A0540] USSN 09/314,871, titled "DISK DRIVE EMPLOYING OFF-LINE SCAN TO COLLECT SELECTION-CONTROL DATA FOR SUBSEQUENTLY DECIDING WHETHER TO VERIFY AFTER WRITE", filed in the USPTO on 5/19/99, in the name of Jonathan Hanmann and Michael Rothberg, and assigned to the assignee of this application (the "Off-Line Scan application"). The disclosure of the Off-Line Scan application is hereby incorporated by reference herein.

The subject matter of this application is also related to the subject matter of an application [K35A0463] USSN 09/138,805, titled "DISK DRIVE HAVING DATA-GUARDING FIRMWARE", filed in the USPTO on Aug. 21, 1998, in the name of Michael Rothberg, and assigned to the assignee of this application (the "Data Guarding application"). The disclosure of the Data Guarding application is hereby incorporated by reference herein.

BACKGROUND OF THE INVENTION

1. Field of the Invention

In general the technical field relates to disk drives used for data storage on computer systems. More particularly, it relates to operating a disk drive in a manner to enable a host computer to assist in rescuing a rescue-candidate location having drive-unrecoverable data.

2. Description of the Prior Art

Users of computer systems depend on disk drives to provide fast and reliable data reproduction. Should data loss occur due to corrupted data on a disk in a disk drive, valuable user data may be lost or the computer system or application programs may fail to run.

During the manufacture of disk drives, data storage areas on the disk are tested for defects that could cause data loss. These areas are identified as unavailable so that these initial defects will not cause data loss. Over the course of operating the disk drive in a system, various defects can occur. These defects are generally referred to as "grown" defects. These defects result from a variety of effects including thermal asperities on the disk surface. Grown defects represent potential data loss.

Present disk drive technology provides for EDAC (Error Detection And Correction) to help prevent data loss. Examples of techniques for providing error correction can be found in the Off-Line Scan and Data Guarding applications. Although EDAC and other methods currently employed in disk drives are able to correct some errors, there remains data that can not be corrected. This is generally referred to as drive-unrecoverable data.

When drive-unrecoverable data is encountered during a host read command, the results can be catastrophic. The host computer has no indication that it will receive a read error from the disk drive. If the unrecoverable data is part of a user data file, the entire file may be unavailable to the user. Unrecoverable data in an application program can cause the program to fail to execute. An operating system component that contains unrecoverable data may lead to a total system crash. The extent of problems unrecoverable data can cause is numerous. The user can try to prevent some of these problems by maintaining backups of his data and periodically running disk scanning software to detect problems.

The above discussion shows that there is a need to avoid having drive-unrecoverable data cause problems for the user. It is desirable to detect and rescue locations having drive-unrecoverable data before the user encounters a read error.

SUMMARY OF THE INVENTION

The invention can be regarded as a method of operating a disk drive for enabling a host computer to assist in rescuing a rescue-candidate location having drive-unrecoverable data. The disk drive includes a disk and an interface to the host computer. The disk defines a multiplicity of addressable locations each having a logical address. The method of operating the disk drive comprises the steps of performing a plurality of read operations on a selected one of the multiplicity of addressable locations and determining whether the selected addressable location contains drive-unrecoverable data. The method further comprises identifying the selected addressable location as a rescue-candidate location if the selected addressable location contains drive-unrecoverable data, recording the logical address of the rescue-candidate location in a list, and transferring the list to the host computer via the interface in response to a list-requesting command from the host computer. The method further comprises responding to a write command from the host computer to write host data to a selected rescue-candidate location having a logical address recorded in the list such that a subsequent read operation can recover the host data. The step of transferring the list to the host computer enables the host computer to assist in rescuing the selected rescue-candidate location.

The invention can also be regarded as a method of operating a computer system for enabling a host computer to assist in rescuing a rescue-candidate location having drive-unrecoverable data. The computer system includes a disk drive, the host computer and an interface between the host computer and the disk drive. The disk drive includes a disk defining a multiplicity of addressable locations each having a logical address. The method of operating the computer system comprises the steps of performing a plurality of read operations on a selected one of the multiplicity of addressable locations and determining whether the selected one of the multiplicity of addressable locations contains drive-unrecoverable data. The method further comprises identifying the selected addressable location as a rescue-candidate location if the selected location contains the drive-unrecoverable data, recording the logical address of the rescue-candidate location in a list, issuing a list-requesting command from the host computer to the disk drive, and transferring the list to the host computer via the interface in response to the list-requesting command. The method further comprises sending a write command to the disk drive to write host data to a selected rescue-candidate location having a logical address recorded in the list such that a subsequent read operation can recover the host data. The step of transferring the list to the host computer enables the host computer to assist in rescuing the selected rescue-candidate location.

DESCRIPTION OF THE PREFERRED EMBODIMENTS

Figure 1:
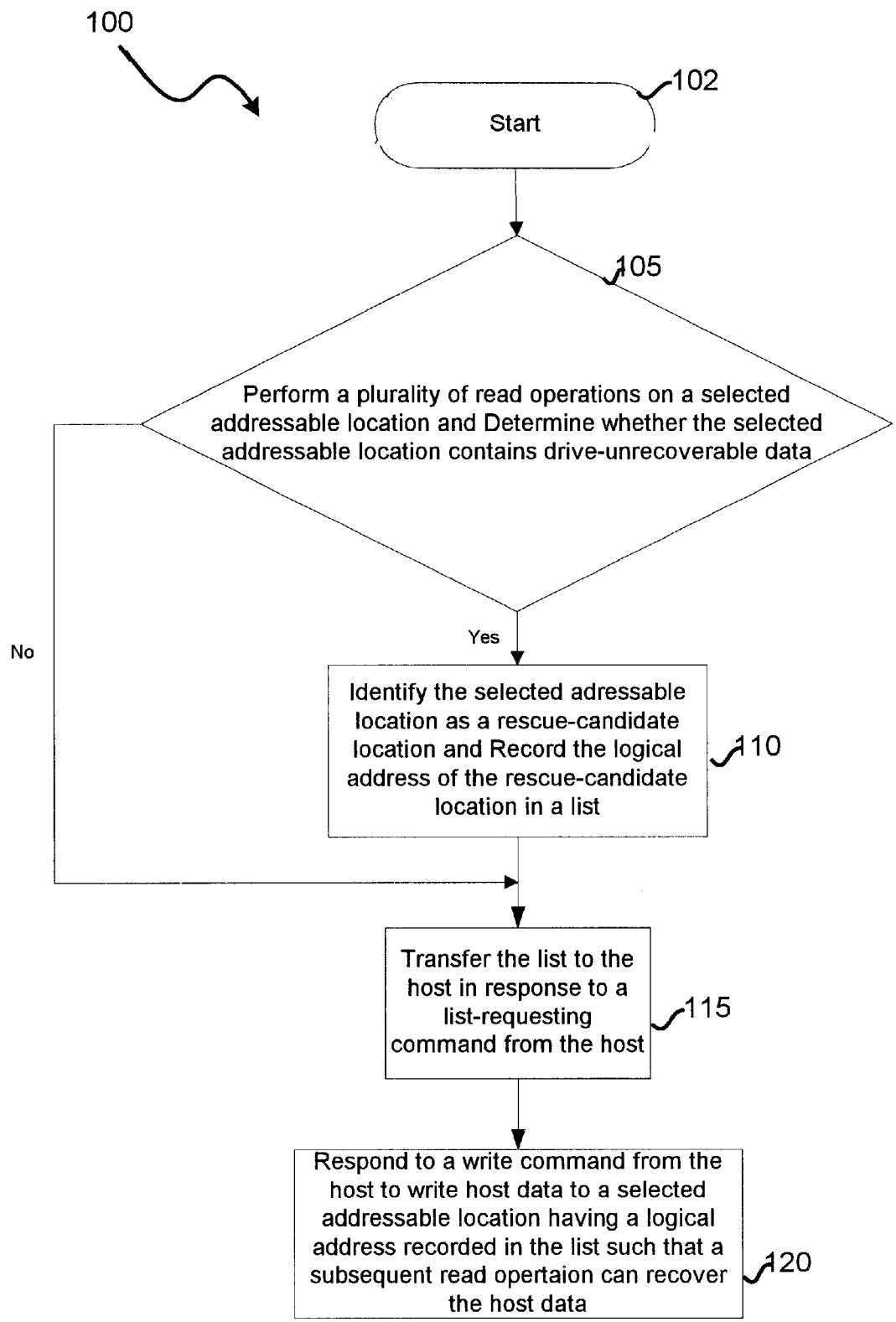
FIG. 1 is a flow chart depicting a method of operating a disk drive for enabling a host computer to assist in rescuing a rescue-candidate location having drive-unrecoverable data.

With reference to FIG. 1 there is shown a method 100 depicting the general steps carried out by a disk drive to enable a host computer to assist in rescuing a rescue-candidate location having drive-unrecoverable data. The disk drive includes a disk and an interface to the host computer. The disk defines a multiplicity of addressable locations each having a logical addressable. The method preferably begins at step 102 when a request for a read is initiated. This request may be an on-line request from the host or an off-line process autonomously generated by the disk drive. Examples of off-line in progress states are described in detail in the Off-Line Scan and Data Guarding applications. In step 105, a plurality of read operations on a selected one of the multiplicity of addressable locations are performed. Step 105 further includes determining whether the selected addressable location contains drive-unrecoverable data. Preferably, an error recovery procedure including the error recovery stages in FIG. 9 of the Data Guarding application is performed for determining whether the selected addressable location contains drive-unrecoverable data. If the selected addressable location contains drive-unrecoverable data, the disk drive will enter step 110 to identify the selected addressable location as a rescue-candidate location and record the logical address of the rescue-candidate location in a list. Each of the rescue-candidate locations recorded in the list is accessible by the host computer. After recording the identity of the rescue-candidate location in the list, the disk drive enters step 115 where it is prepared to transfer the list to the host. The disk drive effects the transfer when a list-requesting command is received from the host. In step 105, if the disk drive determines that data can be recovered from the selected addressable location, the disk drive will proceed to step 115. In step 120, the disk drive responds to a write command from the host to write host data to a selected rescue-candidate location having a logical address recorded in the list such that a subsequent read operation can recover the host data. The step of transferring the list to the host in response to the list-requesting command enables the host to assist in rescuing the selected rescue-candidate location.

Preferably, the disk drive has a firmware-controlled state machine, such as disclosed in the Off-Line Scan and Data Guarding applications, which can be in any of a plurality of states including the off-line-in progress state. The selected addressable location can be identified as a rescue-candidate location during the off-line in-progress state. Alternatively, the selected addressable location can be identified as a rescue-candidate location while the disk drive is processing an on-line command from the host computer.

According to one embodiment, the disk drive has capability for effecting on-the-fly error correction, and addressable locations that contain corrupted data that are correctable on-the-fly are omitted from the list. Furthermore, the disk drive may perform retries to recover data from addressable locations that contain corrupted data, and addressable locations that yield valid data upon a retry are omitted from the list.

According to another embodiment, the disk drive has an interruptible microprocessor and has capability for effecting error correction by interrupting and transferring control to the microprocessor, and addressable locations that contain corrupted data that are correctable under control of the microprocessor are omitted from the list.

Figure 2:
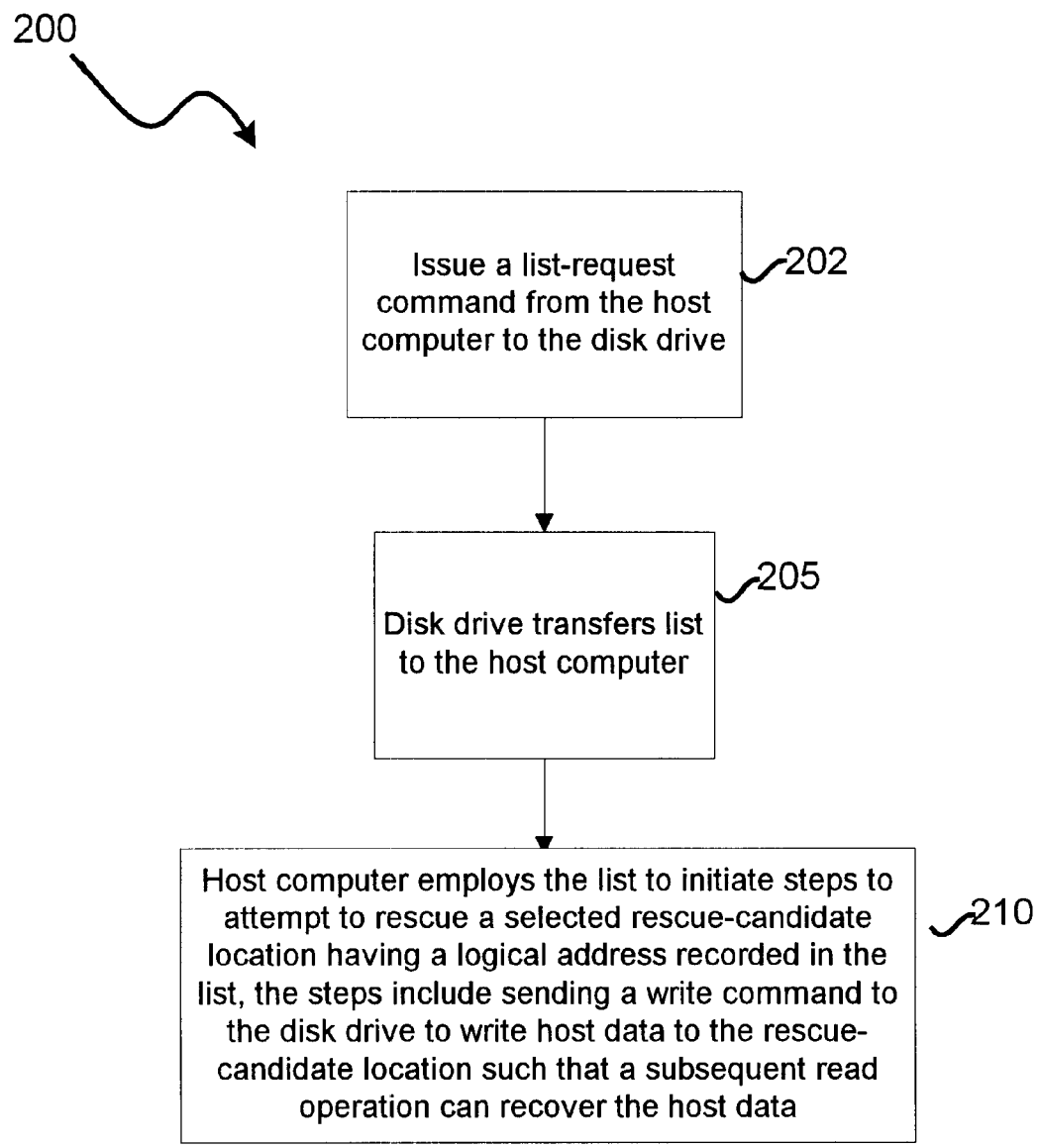
FIG. 2 is a flow chart depicting a method of operating a computer system for enabling a host computer to assist in rescuing a rescue-candidate location having drive-unrecoverable data.

Referring to FIG. 2 there is shown a method 200 including steps carried out by a computer system to enable a host computer to assist in rescuing a rescue-candidate location having drive-unrecoverable data. The computer system includes a disk drive, the host computer and an interface between the host computer and the disk drive. The disk drive includes a disk defining a multiplicity of addressable locations each having a logical address. Preferably, method 200 includes steps 105 and 110 of FIG. 1. In step 202, the host computer issues a list-requesting command to the disk drive via the interface using a suitable protocol. The disk drive responds to the host computer command, in step 205, by transferring the list to the host computer via the interface using the protocol. As shown in step 210, the host computer employs the list to initiate steps to attempt to rescue a selected rescue-candidate location having a logical address recorded in the list. The steps include sending a write command to the disk drive to write host data to the selected rescue-candidate location such that a subsequent read operation can recover the host data. In one embodiment, the host data is autonomously provided by the host computer. According to another embodiment, the host data is based on user input.

Figure 3:
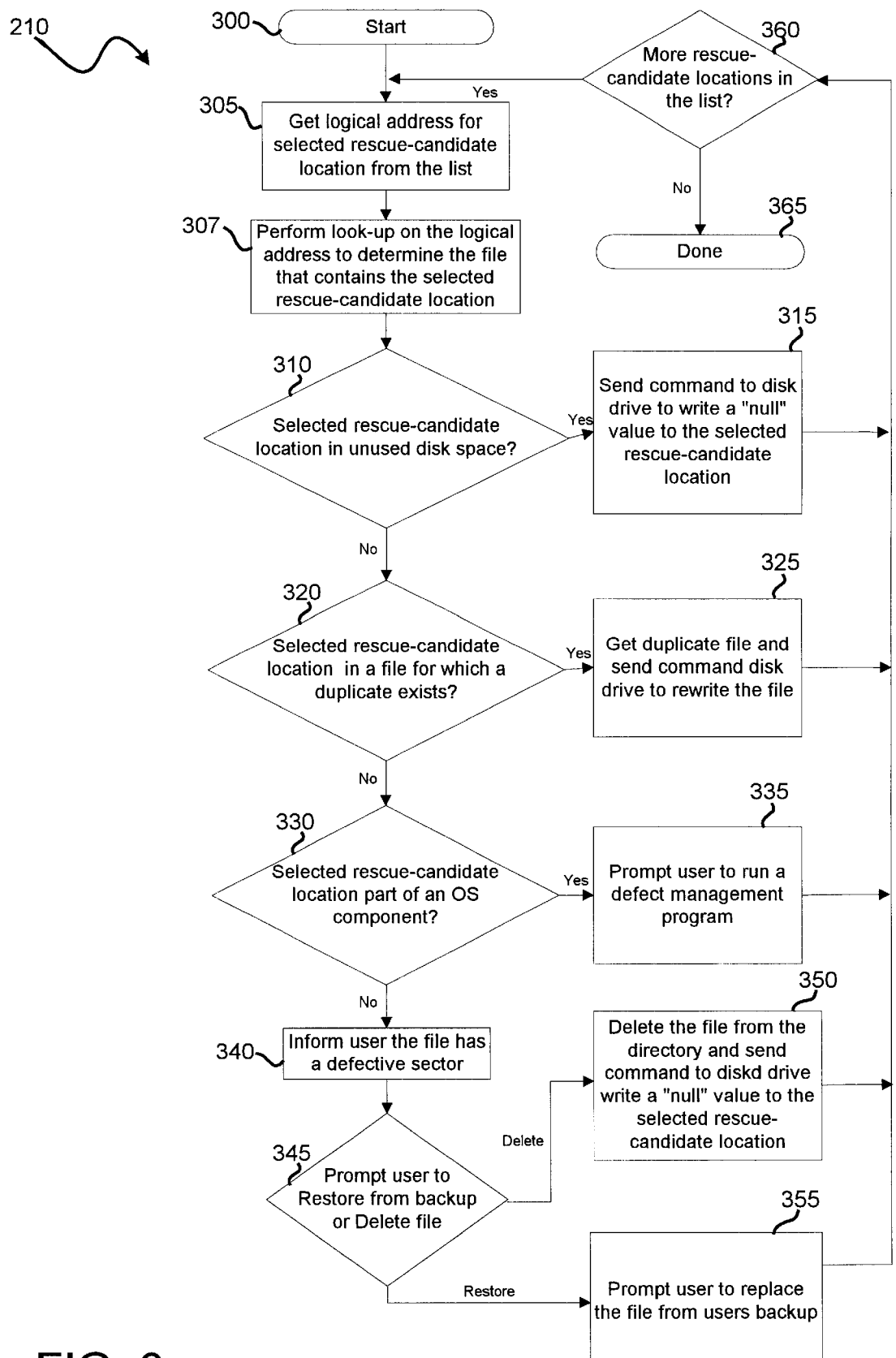
FIG. 3 shows various attempts that may be taken by a host computer to rescue a selected rescue-candidate location having drive-unrecoverable data.

Referring FIG. 3, step 210 illustrates various attempts the host computer may take to rescue a selected rescue-candidate location having a logical address recorded in the list. Preferably, the various attempts start at step 300 after the host computer has received the list from the disk drive. At step 305, the host computer gets a logical address, such as a physical address or a logical block address (LB), for a rescue-candidate location from the list. At step 307, the host computer performs a look-up on the logical address to determine which file contains that rescue-candidate location. This look-up could be a reverse look-up in the disk drive's FAT (File Allocation Table). In step 310, if the results of the look-up indicate that the rescue-candidate location is not allocated to a file and is in unused area, the disk drive is commanded to write a "null" value to the rescue-candidate location as shown in step 315. In this instance, the host data sent to the disk drive is the "null" value. This "null" value can be a string of zeros or any other pattern indicating an unused block. Upon receiving this command, the disk drive attempts a write and read verify on the sector. A method of performing this is described in the related Off-Line Scan application. If the logical address for the rescue-candidate location is unable to retain the "null" value so that a subsequent read operation can recover the "null" value, the disk drive will allocate a spare addressable location (such as a spare sector) to the logical address. Upon completion of step 315, the host computer will determine if there are additional rescue-candidate locations in the list in step 360. As shown in step 360, the process will either return to step 305 to process additional rescue-candidate locations or stop at step 365.

Returning to step 310, if the logical address for the rescue-candidate location is allocated to a file, step 320 is entered. At this point the host computer checks if there is a duplicate or image of the file in the computer system. If a duplicate file is found, then step 325 is entered. At step 325, the host computer obtains data from the duplicate file and commands the disk drive to write the data in order to restore original data at the selected rescue-candidate location. In this instance, the host data sent to the disk drive is data from the duplicate file. The disk drive performs the write and read verify operation described in the Off-Line Scan application to determine whether to allocate a spare addressable location to the logical address so that a subsequent read operation can recover the file. Upon completion of step 325, the host computer goes to step 360 and checks for additional rescue-candidate locations.

In step 320, if a duplicate or image of the file could not be found the check in step 330 is performed. Step 330 checks if the logical address of a rescue-candidate location is part of an OS (operating system) component, such as part of the FAT. If the result of the check in step 330 is the user is prompted by a message to run a defect management program in step 335. The defect management program may be an OS supplied utility or other such program. Upon leaving step 335, the host computer goes to step 360 to check for additional rescue-candidate locations.

At step 330, if the file is not part of an OS component, then the file may be a user data file or a user installed application file. In step 340 the user is informed that the file has a "defective sector." This may involve supplying the user with the name of the file containing the defective sector. At step 345, the user is asked if the file can be deleted or if the user wishes to restore the file from the user's backup. If the user determines that the file is not needed then, at step 350, the host computer deletes the file from the directory and instructs the disk drive to write the "null" value to the logical address for the rescue-candidate location. The disk drive performs the write and read verify operation described in the Off-Line Scan application to determine whether to allocate a spare addressable location (such as a spare sector) to the logical address. The host then proceeds to step 360 to check for additional rescue-candidate locations in the list. If the user wishes to restore the file, then at step 355 the user is prompted to replace the file from the user's backup. After step 355, the host computer goes to step 360 to check for additional rescue-candidate locations.

We claim:

1. A method of operating a disk drive for enabling a host computer to assist in rescuing a rescue-candidate location having drive-unrecoverable data, the disk drive including a disk and an interface to the host computer, the disk defining a multiplicity of addressable locations each having a logical address, the method of operating the disk drive comprising the steps of:

performing a plurality of read operations on a selected one of the multiplicity of addressable locations;

determining whether the selected addressable location contains drive-unrecoverable data;

identifying the selected addressable location as a rescue-candidate location if the selected addressable location contains drive-unrecoverable data;

recording the logical address of the rescue-candidate location in a list;

transferring the list to the host computer via the interface in response to a list-requesting command from the host computer; and responding to a write command from the host computer to write host data to a selected rescue-candidate location having a logical address recorded in the list such that a subsequent read operation can recover the host data;

whereby the step of transferring the list to the host computer enables the host computer to assist in rescuing the selected rescue-candidate location.

2. A method in accordance with claim 1, wherein the disk drive has capability for effecting on-the-fly error correction, and addressable locations that contain corrupted data that are correctable on-the-fly are omitted from the list.

3. A method in accordance with claim 2, wherein the disk drive performs retries to recover data from addressable locations that contain corrupted data, and addressable locations that yield valid data upon a retry are omitted from the list.

4. A method in accordance with claim 2, wherein the disk drive has an interruptible microprocessor and has capability for effecting error correction by interrupting and transferring control to the microprocessor, and addressable locations that contain corrupted data that are correctable under control of the microprocessor are omitted from the list.

5. A method in accordance with claim 1, wherein the disk drive has a firmware-controlled state machine which can be in any of a plurality of states including an off-line in-progress state, the selected addressable location is identified as a rescue-candidate location during the off-line in-progress state.

6. A method in accordance with claim 1, wherein the selected addressable location is identified as a rescue-candidate location while the disk drive is processing an on-line command from the host computer.

7. A method of operating a computer system for enabling a host computer to assist in rescuing a rescue-candidate location having drive-unrecoverable data, the computer system including a disk drive, the host computer and an interface between the host computer and the disk drive, the disk drive including a disk defining a multiplicity of addressable locations each having a logical address, the method of operating the computer system comprising the steps of:

performing a plurality of read operations on a selected one of the multiplicity of addressable locations;

determining whether the selected one of the multiplicity of addressable locations contains drive-unrecoverable data;

identifying the selected addressable location as a rescue-candidate location if the selected location contains the drive-unrecoverable data;

recording the logical address of the rescue-candidate location in a list;

issuing a list-requesting command from the host computer to the disk drive;

transferring the list to the host computer via the interface in response to the list-requesting command; and sending a write command to the disk drive to write host data to a selected rescue-candidate location having a logical address recorded in the list such that a subsequent read operation can recover the host data;

whereby the step of transferring the list to the host computer enables the host computer to assist in rescuing the selected rescue-candidate location.

8. A method in accordance with claim 7, wherein the host data is autonomously provided by the host computer.

9. A method in according with claim 7, wherein the host data is based on user input.

* * * * *